(12) United States Patent
Nikodym

(10) Patent No.: US 8,119,951 B2
(45) Date of Patent: Feb. 21, 2012

(54) WELD WIRE WITH ENHANCED SLAG REMOVAL

(75) Inventor: Anthony Franklin Nikodym, Troy, OH (US)

(73) Assignee: Hobart Brothers Company, Troy, OH (US)

( * ) Notice: Subject to any disclaimer, the term of this patent is extended or adjusted under 35 U.S.C. 154(b) by 1740 days.

(21) Appl. No.: 10/376,185

(22) Filed: Feb. 26, 2003

(65) Prior Publication Data

US 2003/0178402 A1    Sep. 25, 2003

Related U.S. Application Data

(63) Continuation of application No. 09/573,514, filed on May 17, 2000, now Pat. No. 6,608,284.

(51) Int. Cl.
*B23K 35/22* (2006.01)

(52) U.S. Cl. ........ 219/146.1; 219/137 WM; 219/146.23

(58) Field of Classification Search ............... 219/146.1, 219/137 WM, 15.1, 146.23, 146.3, 146.31, 219/146.32, 145.1
See application file for complete search history.

(56) References Cited

U.S. PATENT DOCUMENTS

| | | | | |
|---|---|---|---|---|
| 4,345,140 | A | * | 8/1982 | Godai et al. ............ 219/146.23 |
| 5,055,655 | A | | 10/1991 | Chai et al. |
| 5,120,931 | A | | 6/1992 | Kotecki et al. |
| 5,225,661 | A | | 7/1993 | Chai et al. |
| 5,824,992 | A | | 10/1998 | Nagarajan et al. |
| 5,857,141 | A | | 1/1999 | Keegan et al. |
| 6,008,462 | A | * | 12/1999 | Soltwedel ................ 219/91.2 |

FOREIGN PATENT DOCUMENTS

| | | |
|---|---|---|
| EP | 0508439 | 10/1992 |
| EP | 0652071 | 5/1995 |
| JP | 61020693 | 1/1986 |
| JP | 62040995 | 2/1987 |
| JP | 03297596 | 12/1991 |
| JP | 4-197597 | 7/1992 |
| JP | 06 015480 A | 1/1994 |
| JP | 06015480 | 1/1994 |
| JP | 06142979 | 5/1994 |
| JP | 06182585 | 7/1994 |
| JP | 7-276087 | 10/1995 |
| JP | 09-052193 | 2/1997 |
| JP | 10-230390 A | 11/1998 |

OTHER PUBLICATIONS

"Standard Welding Terms and Definitions, ANSI/AWS A3.0-94," American Welding Society, pp. 15, 22,40,68, 69 (1994).
"Specification for Stainless Steel Electrodes for Flux Cored Arc Welding and Stainless Steel Flux Cored Rods for Gas Tungsten Arc Welding, AWS A5,22-95," p. 1 (1995).
Lyttle, Kevin A., "Metal Cored Wires: Where Do They Fit in Your Future?", Welding Journal (Apr. 1996).
"Corex Metal-Cor Electrodes, True Excellence in Metal Cored Electrodes for Low Spatter, Low Fume Welding," Corex. "Metalloy Metal-Cored Wires, True Excellence in Metal-Cored Wires," Tri-Mark, Hobart Brothers Company (1998).
Oh, O.W et al., "The Influence of Boron and Titanium on Low-Carbon Steel Weld Metal," Welding Research Supplement, pp. 151-158 (Apr. 1990).
Official Action, Japanese Application No. 2001-111440 (English translation provided) (Aug. 23, 2011).

* cited by examiner

*Primary Examiner* — M. Alexandra Elve
(74) *Attorney, Agent, or Firm* — Thompson Hine LLP

(57) ABSTRACT

A low alloy or mild steel weld containing a slag-modifying additive selected from the group consisting of antimony, bismuth, germanium and compounds thereof;
A weld wire for forming a low alloy or mild steel weld containing a slag-modifying additive selected from the group consisting of antimony, bismuth, germanium and compounds thereof.

34 Claims, 2 Drawing Sheets

WELD WIRE WITH ENHANCED SLAG REMOVAL

CROSS REFERENCE TO RELATED APPLICATIONS

This application is Continuation Application of application Ser. No. 09/573,514 filed May 17, 2000 now U.S. Pat. No. 6,608,284.

BACKGROUND

The invention relates generally to weld wires useful in joint and surface welding and more specifically to solid and metal-core weld wires which produce improved weld deposits having self-peeling or readily removable slag islands.

Solid and metal cored weld wires are commonly employed in electric arc welding of mild and low alloy steel base metals. These wires yield high strength welds in a single pass and multiple pass at high welding speed. These weld wires are formulated to provide a solid, nonporous weld bead with tensile strength, ductility and impact strength to meet the desired end use applications. Solid and metal cored wires are also formulated to minimize slag, however, small slag islands or a thin line of slag is often produced in the weld toe. These islands or slag lines must be removed before painting or coating the weld, because if they peel off after the weld is painted or coated, they detract from the appearance of the product or serve as corrosion initiation sites.

Solid wire is one of the most popular types of welding wire. Continuous welding made possible by solid wire leads to higher productivity when compared to shielded metal arc welding (stick electrode welding). Solid wires are made by drawing hot rolled rod of a specific chemistry to a desired diameter. Solid wire is then cleaned and copper plated if necessary. Manganese and silicon present in the solid wire oxidizes during the welding process and produces isolated, thin slag islands. The productivity advantages which solid wires provide are sometimes offset by the time required to remove the slag deposits or islands that form on the surface of the weld.

Metal-core wires are used increasingly as an alternative to solid weld wires for improved productivity in structural fabrication. Metal-core weld wires are composite tubular filler metal electrodes having a metal sheath and a core containing a composition of various powdered materials. The core composition of metal-core wires includes iron powder, usually as filler material. The core composition comprises approximately 1 to 45% of the total wire weight. The iron powder content is usually considerable and comprises generally between approximately 0 and 44% of the total wire weight. During the manufacture of metal-core wires, the core composition is blended and deposited onto a steel strip, which is formed into a tube or sheath about the core composition in a forming mill. The steel sheath surrounding the core composition is then drawn through reducing dies to a specified diameter. Metal-core wires provide increased weld deposition rates and produce wider and more consistent penetration profiles than solid wires. In addition, metal-core wires generate less fumes and spatter, provide improved arc stability and produce weld deposits with improved wetting characteristic in comparison to solid wires. However, these productivity advantages which metal-core wires provide are sometimes offset by the time required to remove the slag deposits or islands which form on the surface of the weld.

Using conventional solid and metal-core wires, slag islands tend to form at the toe or edges of the weld. At this location, the weld has a somewhat concave contour as shown in FIG. 1. The slag deposit has a tendency to be drawn into this concavity making it very difficult to remove. In accordance with the present invention, it has been found that by making certain alloy additions to the solid and metal-core wire, the slag islands tend to form predominantly at a point that is removed from the edges of the weld. At these locations, the slag deposits either self-peel or they are easily removed.

U.S. Pat. No. 4,345,140 to Godai et al. is directed to a flux-cored composite wire for use in welding stainless steels. The patent discloses that the addition of low melting point metallic oxides such as lead, copper, bismuth, antimony and tin oxide is useful in enhancing the separability of slag. The low melting point metal oxide is preferably added in an amount of about 0.1 to 0.25%. A composite flux cored wire for stainless steel welding is fundamentally different than the mild steel and low alloy steel weld wires of the present invention. Flux cored wires for welding stainless steel contain a flux which includes nonmetallic inorganic components which, by comparison, are present in significantly higher percentages (e.g., 5 to 10%) than in a mild or low alloy metal core wire welding wires. A flux core wire produces a slag which covers the entire surface of the weld and adheres strongly to the weld bead making it very difficult to remove. Metal-core wires have a core composition comprising primarily metallic and alloying powders with substantially reduced amounts of nonmetallic components (e.g., less than 5%). In contrast to metal-core wires, flux core wires do not form small slag islands in the toe regions of the weld deposit.

SUMMARY OF THE INVENTION

It has been found that the addition of antimony, bismuth and/or germanium to a weld alloy causes the slag deposits or islands to form at positions removed from the toe or edge of mild and low alloy steel weld beads and thereby facilitates removal of the slag islands. These elements can be added as metals, alloys or metal compounds (e.g., oxides, carbonates, fluorides, sulfates, or sulfides). Accordingly, one manifestation of the invention is a weld containing these metal additions; another more specific manifestation of the invention is a mild steel or low alloy steel weld containing these additions. The invention also includes a weld bead in which the slag islands are located in areas removed from the toes. Another manifestation of the invention is a low alloy weld containing antimony, bismuth and/or germanium in an amount sufficient to facilitate removal of slag islands. The preferred addition is antimony or antimony oxide.

Still another manifestation of the invention is a solid or metal-core wire that contains antimony, bismuth, and/or germanium. Another manifestation is a metal core wire that includes a steel sheath and a core wherein at least one of the sheath and the core contains antimony, bismuth and/or germanium. In accordance with further manifestations of the invention, the wire is formulated to provide a mild steel or a low alloy steel weld.

Another manifestation of the invention is a method for forming a weld which comprises melting a solid or metal-core wire having the compositions described previously.

Still another manifestation of the invention is a method for forming a weld which comprises melting, by application of an electrical arc, a metal-core wire having the compositions described herein.

DETAILED DESCRIPTION OF THE INVENTION

Figure 1:
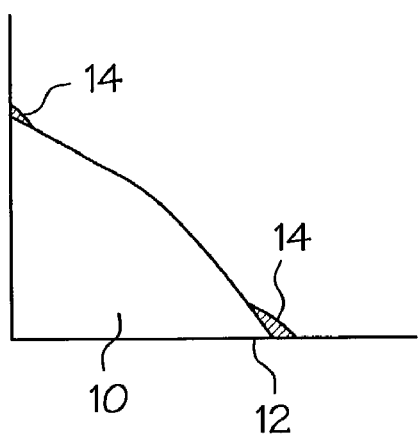
FIG. 1 is a schematic cross-sectional representation of a slag deposit in a conventional metal core weld showing slag islands at the toe of the weld.

Solid and metal-core wires in accordance with the invention have the wire composition, between the approximate ranges, by total weight of the wire indicated in Table 1:

TABLE 1

Solid and Metal Core Wire Composition

Weight Percentage Range

| Element | Generally | Mild Steel | Low Alloy |
|---|---|---|---|
| C | 0.0-0.13 | 0.0-0.12 | 0.0-0.13 |
| Mn | 0.0-3.5 | 0.0-3.5 | 0.0-3.5 |
| Si | 0.0-2.0 | 0.0-2.0 | 0.0-2.0 |
| Cr | 0.0-10.5 | 0.0-0.5 | 0.0-10.5 |
| Ni | 0.0-3.75 | 0.0-0.5 | 0.0-3.75 |
| Ti | 0.0-0.1 | 0.0-0.1 | 0.0-0.1 |
| Mo | 0.0-1.2 | 0.0-0.5 | 0.0-1.2 |
| B | 0.0-0.1 | 0.0-0.1 | 0.0-0.1 |
| V | 0.0-0.25 | 0.0-0.5 | 0.0-0.25 |
| Sb/Bi/Ge | 0.04-0.3 | 0.04-0.3 | 0.04-0.3 |
| Fe | 85.6-99.25 | 96.25-99.25 | 85.6-99.0 |

In the tables herein elemental percentages are reported to within one-hundredth of a percent, however, those skilled in the art will recognize that these percentages reflect industry standards and are not a technical limit on the invention. Sb, Bi and Ge can be used in combination or in the alternative. As already mentioned, Sb is the preferred additive. In the most typical embodiments of the invention, the wire (and weld bead) contains a minimum of 0.5% Mn and a minimum of 0.2% Si. While it is desirable to minimize carbon to minimize fume generation, typically the wire (and weld bead) will contain a minimum of 0.003% carbon. Industry standards for mild and low alloy steel limit the combined amount of Cr, Ni, Mo, V, Ti, B, Sb, Bi, and Ge to less than 0.5%. Higher amounts can be used but industry standards would not be satisfied.

Analysis of welds in accordance with the invention has shown that the alloy additions reside in the weld as opposed to the slag islands leading to the conclusion that in the case of metal core wire, the metal additions can be made to the sheath or the core. As a matter of convenience, the additions are generally made to the core. Core and sheath compositions by total weight of the wire for metal core wires are provided in Table 2 and Table 3:

TABLE 2

Core Composition for Metal Core Wires

WEIGHT PERCENT RANGES

| ELEMENT | Generally | Mild Steel | Low Alloy |
|---|---|---|---|
| C | 0.0-0.13 | 0.0-0.12 | 0.0-0.13 |
| Mn | 0.0-3.5 | 0.0-3.5 | 0.0-3.5 |
| Si | 0.0-2.0 | 0.0-2.0 | 0.0-2.0 |
| Cr | 0.0-10.5 | 0.0-0.5 | 0.0-10.5 |
| Ni | 0.0-3.75 | 0.0-0.5 | 0.0-3.75 |
| Ti | 0.0-0.1 | 0.0-0.1 | 0.0-0.1 |
| Mo | 0.0-1.2 | 0.0-0.5 | 0.0-1.2 |
| B | 0.0-0.1 | 0.0-0.1 | 0.0-0.1 |
| V | 0.0-0.25 | 0.0-0.5 | 0.0-0.25 |
| Sb/Bi/Ge | 0.04-0.3 | 0.04-0.3 | 0.04-0.3 |
| Fe | 0.0-44.0 | 0.0-44.0 | 0.0-44.0 |

TABLE 3

Sheath Composition:

Weight Percentage Ranges

| Element | Generally | Mild Steel | Low Alloy |
|---|---|---|---|
| C | 0.0-0.13 | 0.0-0.12 | 0.0-0.13 |
| Mn | 0.0-3.5 | 0.0-3.5 | 0.0-3.5 |
| Si | 0.0-2.0 | 0.0-2.0 | 0.0-2.0 |
| Sb/Bi/Ge | 0.04-0.3 | 0.04-0.3 | 0.04-0.3 |
| Fe | 55.25-99.25 | 55.25-99.25 | 55.0-99.0 |

The antimony can be added to the core as the elemental metal or as a compound or alloy such as $Sb_2S_3$; $SbF_3$; $Sb_2(SO_4)_3$; or $Sb_2O_3$. Bismuth can be added as the metal, as $(BiO)_2CO_3$, $Mn_2Bi_3$, or $Bi_4Ge_3O_{12}$. Germanium can be added as the metal or as the foregoing compound with bismuth. Surprisingly, the oxides of antimony can be added to the metal powder and produce the advantages of the invention. Slag is made up of oxides. In order to reduce the amount of slag, it is common practice that the amount of oxides in the core composition is held to a minimum. This makes the addition of oxides to the core composition counterintuitive. The slag-modifying additive is preferably incorporated in the core composition in an amount of about 0.3 to 2.0 wt. % (0.04 to 0.3 wt. % of the wire). Those skilled in the art will understand that if the Sb/Bi/Ge addition is made to the core, it will not be necessary to make it to the sheath and if it is made to the sheath it will not be necessary to make it to the core. Of course a partial addition to both sheath and core is not precluded. In accordance with the invention any of these compositions, i.e., the composition for the wire as a whole, the sheath, or the core, is modified to include an amount of antimony, bismuth or germanium or a compound thereof in an amount sufficient to promote the placement and subsequent release of the slag islands. Typically these materials are added in an amount of about 0.04 to 0.3% based on the total weight of the wire and preferably 0.14 to 0.21%.

The addition of antimony has been observed to reduce the impact strength of the weld. Industry standards require an impact strength at 0° F. of at least 20 ft-lbf in a E70C-3M weld as defined in AWS A5.18 and a impact strength at −20° F. of 20 ft-lbf in a E70C-6M weld. In order to compensate for the addition of the antimony to meet these industry standards, it is desirable to add nickel and/or a combination of titanium and boron to the weld. Typically these metals are added to the core composition. For a mild steel weld, the nickel is added in an amount up to 0.5% based on the weld metal. In accordance with industry standards for a low alloy steel weld, the nickel can be added in amounts up to 3.75% based on the weld metal. Ti is added to the core composition in an amount up to 0.75% and typically 0.03-0.05% in the weld metal. Boron is added in an amount up to 0.014 and typically 0.002-0.004% in the weld metal. While nickel and Ti—B are not generally added to the sheath, this can be done alone or in conjunction with its addition to the core. For a discussion of Ti and B additions see Oh, D. W. et al., The Influence of Boron and Titanium on Low-Carbon Steel Weld Metal, *Welding Journal*, April, 1990, pp 151-S to 158-S. Sheath additions are adjusted such that the weld exhibits the desired impact strength and meets industry chemical composition standards.

Welds formed in accordance with the invention have essentially the same composition as the wire with the exception of very small losses in slag and fume of manganese and silicon in particular. Accordingly, the percentages set forth in Table 1 will also be used to define the composition of the weld.

In accordance with this invention any of the following (but not limited to) commercially available carbon steel and low alloy steel metal core wires can be modified to include antimony, bismuth and/or germanium as described herein. The following tables represent these products and their typical deposit chemistry.

TABLE 4

Carbon Steel

| Metalloy ® Product | AWS Class | C | Mn | Si | P | S | Fe |
|---|---|---|---|---|---|---|---|
| 70 | E70C-6M | .06 | 1.39 | .70 | .011 | .014 | Bal. |
| 71 | E70C-6M | .09 | 1.47 | .70 | .008 | .013 | Bal. |
| 70X | E70C-6M | .04 | 1.50 | .70 | .008 | .013 | Bal. |
| 76 | E70C-6C | .09 | 1.29 | .61 | .010 | .016 | Bal. |
|  | E70C-6M | .05 | 1.56 | .75 | .009 | .013 |  |
| 70R | E70C-6C | .06 | 1.62 | .63 | .011 | .016 | Bal. |
|  | E70C-6M | .09 | 1.67 | .67 | .012 | .018 |  |
| Galvolloy ® | E70C-GS | .03 | .50 | .30 | .015 | .015 | Bal. |

TABLE 5

Low Alloy Steel

| Metalloy ® Product | AWS Class | C | Mn | Si | Ni | Cr | Mo | Cu | Fe |
|---|---|---|---|---|---|---|---|---|---|
| 80B2 | E80C-B2 | .07 | .78 | .42 |  | 1.25 | .47 |  | Bal. |
|  |  | .06 | .82 | .29 |  | 1.36 | .50 |  |  |
| 80D2 | E90C-G | .10 | 1.27 | .30 | .01 |  | .49 | .05 | Bal. |
|  |  | .08 | 1.94 | .66 | .02 |  | .50 | .02 |  |
| 80N1 | E80C-Ni1 | .05 | 1.11 | .36 | .88 |  | .13 |  | Bal. |
|  |  | .05 | .86 | .21 | .97 |  | .14 |  |  |
| 80N2 | E80C-Ni2 | .06 | 1.16 | .37 | 2.42 |  |  |  | Bal. |
|  |  | .03 | .77 | .28 | 2.23 |  |  |  |  |
| 80W | E80C-G | .04 | 1.19 | .63 | .61 | .55 |  | .54 | Bal. |
| 90 | E90C-G | .05 | 1.32 | .33 | 1.89 |  | .37 |  | Bal. |
|  |  | .03 | 1.30 | .28 | 1.72 |  | .41 |  |  |
| 90B3 | E90C-B3 | .09 | .62 | .39 |  | 2.07 | 1.01 |  | Bal. |
|  |  | .07 | .70 | .35 |  | 2.30 | 1.00 |  |  |
| 110 | E110C-G | .07 | 1.63 | .48 | 2.22 | .21 | .59 |  | Bal. |

Figure 2:
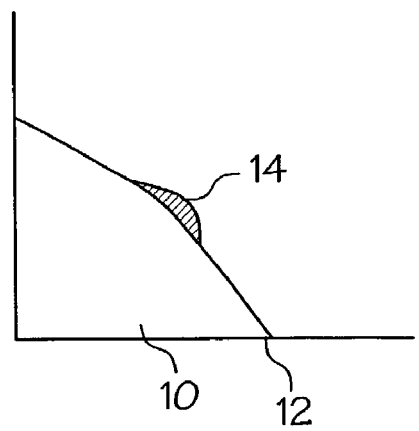
FIG. 2 is a schematic cross-sectional representation of a slag deposit in a weld in accordance with this invention sharing slag islands at the center of the weld.
Figure 3:
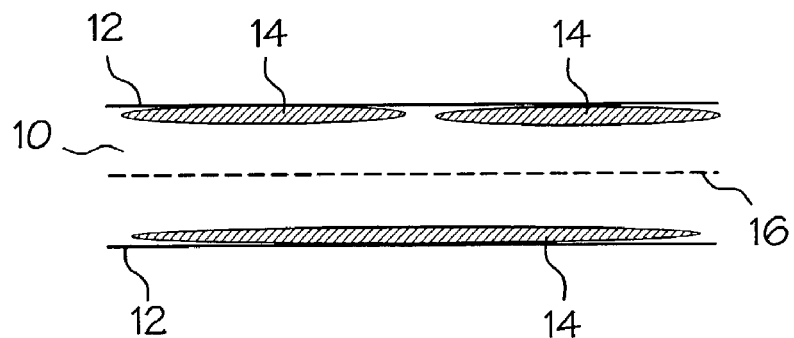
FIG. 3 is a schematic illustration of the surface of a weld made using a conventional metal core weld.
Figure 4:
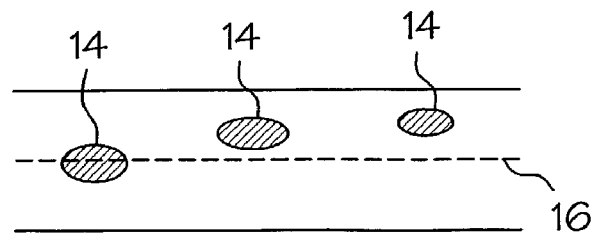
FIG. 4 is a schematic illustration of the surface of a weld made using a metal-core wire in accordance with the invention described herein.
Figure 5:
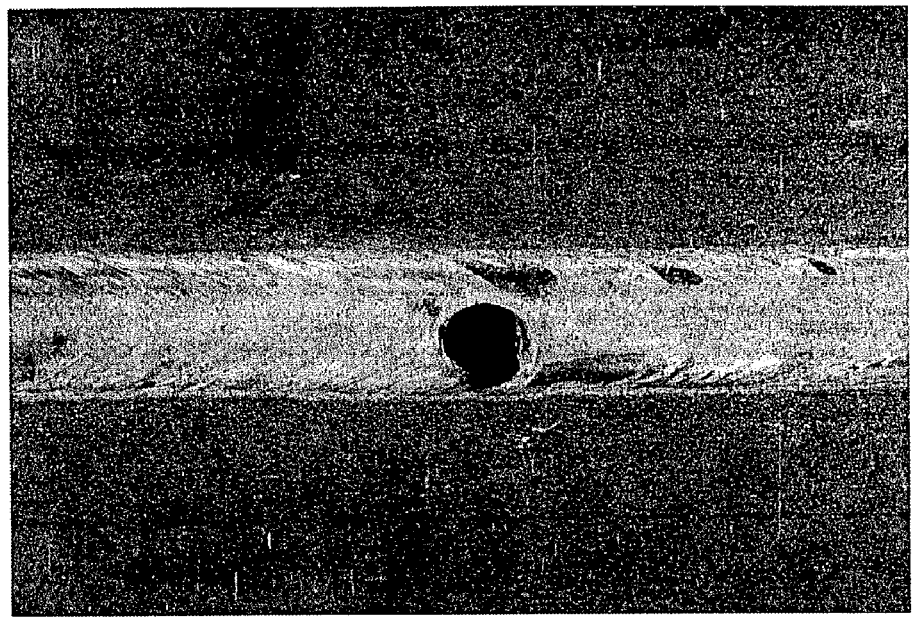
FIG. 5 is a photograph of a weld formed with a metal core wire in accordance with Example, Test 3 from Table 6 herein.
Figure 6:
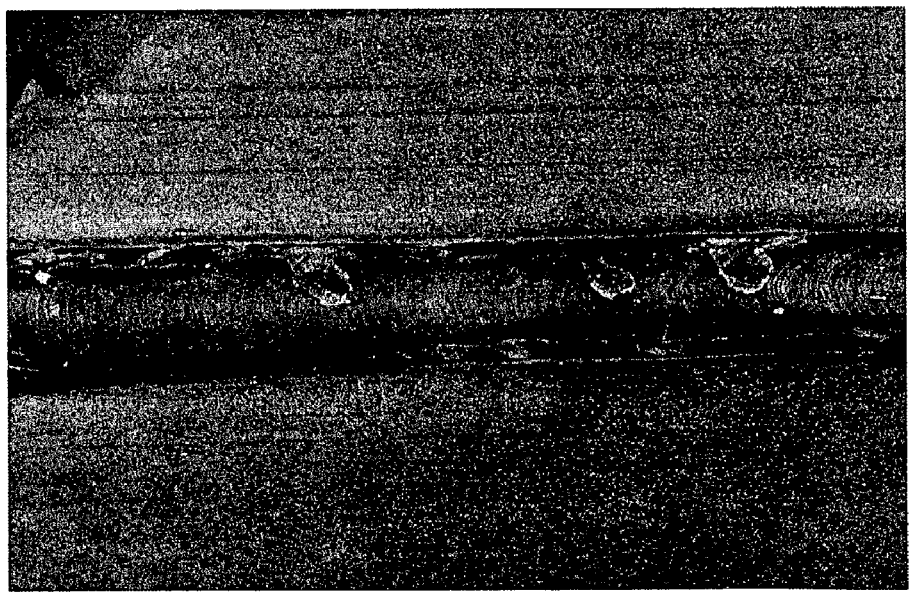
FIG. 6 is a photograph of a weld formed using Metalloy 76® weld wire which is commercially available from Hobart Brothers Corporation.

FIGS. 1 and 3 illustrate a weld 10 formed using a conventional metal-core wire and FIGS. 2 and 4 illustrate a weld 10 in accordance with the invention. As shown in the figures, the toe area 12 of the weld 10 forms a concavity in association with the adjacent welded part. When a slag deposit 14 is drawn into this concavity, it is very difficult to remove. By contrast, in accordance with the invention, the addition of antimony causes the slag deposits 14 to form away from the edges 12 of the weld where the weld deposit is convex. As shown in FIGS. 2 and 4, while not desiring to bound, in the latter locations, the contact angle between the slag deposit and the weld is much greater than the contact angle (not measured) between the weld slag deposit and the weld in the toe area which leads to the placement of the slag islands removed from the toes. This will make the slag islands much easier to remove and, in some cases, these slag deposits will simply pop off the weld as a result of differences in the rate of cooling of the slag as contrasted with the weld.

The invention is illustrated in more detail by the following examples.

EXAMPLE

Metalloy® 76 core weld wires were prepared in which slag-modifying additive was added to the core in the amounts shown in the following table.
Where:
 a. Elemental % core is the elemental percent of the additive based in the total weight of the core composition.
 b. ARC is a subjective rating from 0 (worst) to 10 (best) that includes the following arc characteristics: stability, consistency, and ease of use.
 c. Si Islands is the number of slag islands. A measure of 8 or higher corresponds to an almost complete line of slag along the length of the weld.
 d. Location is a description of the location of the islands in which C means center, T means toe.

The slag deposits were removed and the ease of removal was evaluated in a blind study the results shown in the table.

TABLE 6

Test Results

| TEST | Compound | Element % Core | ARC | Si Islands | Location | Ease of Removal |
|---|---|---|---|---|---|---|
| 1 | Sb | 0.668 | 9 | 4.5 | C | EASY |
| 2 | Sb | 1.002 | 9 | 3 | C | EASY |
| 3 | Sb | 1.337 | 9 | 1 | C | EASY |
| 4 | Sb | 1.671 | 8 | 2 | C | EASY |
| 5 | Bi | 0.668 | 6 | 8 | T | EASY |
| 6 | Bi | 1.002 | 6 | 8 | T | EASY |
| 7 | Bi | 1.337 | 6 | 8.5 | T | EASY |
| 8 | Bi | 1.671 | 6 | 8.5 | T | EASY |
| 9 | Ge | 1.100 | 9.5 | 8 | T | MEDIUM |
| 10 | Bi4Ge3O12 | 0.668 | 9.5 | 8 | T | MEDIUM |
| 11 | Mn2Bi3 | 0.668 | 7 | 8 | T | EASY |
| 12 | Bi2S3 | 0.450 | 8 | 3 | T | MEDIUM |
| 13 | (BiO)2CO3 | 0.668 | 8 | 6 | T | MEDIUM |
| 14 | (BiO)2CO3 | 1.002 | 9 | 5 | T | MEDIUM |
| 15 | Sb2S3 | 0.668 | 9 | 4 | C | EASY |
| 16 | Sb2S3 | 1.337 | 8 | 3.5 | C | EASY |
| 17 | SbF3 | 0.668 | 8 | 4 | T | EASY |
| 18 | SbF3 | 1.337 | 8 | 4 | C | EASY |
| 19 | Sb2(SO4)3 | 0.668 | 8 | 2 | T | EASY |
| 20 | Sb2(SO4)3 | 1.337 | 8 | 2 | C | EASY |
| 21 | Sb2O3 | 0.668 | 8 | 4 | C | EASY |
| 22 | Sb2O3 | 1.002 | 6 | 3 | C | EASY |
| 23 | Sb2O3 | 1.337 | 7 | 2.5 | C | EASY |
| 24 | Sb2O3 | 1.671 | 7 | 3 | C | EASY |
| 25 | Metalloy 76 | N/A | 8 | 8.5 | T | DIFFICULT |

Based upon the discussion herein those skilled in the art will also recognize that the slag-modifying additive can also be introduced into the weld by placing it in a coating on the solid or tubular wire. For example, it is well known to plate a copper coating on solid wire. The slag-modifying additive may conceivably be incorporated into this coating or applied in a coating of its own. The slag-modifying additive might also be applied to the surface of a solid or metal core wire using a technique such as chemical vapor deposition.

Having described the invention in detail and by reference to specific embodiments thereof, it will be apparent the numerous modifications and variations are possible without separating from the spirit and scope of the invention.

The invention claimed is:

1. A method for forming a low alloy steel or a mild steel weld having readily removable slag islands which comprises melting in an electric arc a metal core weld wire to form a low alloy steel or a mild steel weld, the metal core weld wire comprising a steel sheath and a core, the core including a composition disposed therein that includes a slag-modifying additive selected from the group consisting of antimony and compounds thereof, the metal core weld wire containing less than 5% by weight nonmetallic inorganic components and less than 10% by weight chromium wherein forming a low alloy steel weld said wire contains based upon the total weight of the wire about:

| ELEMENT | Wt. % |
|---|---|
| C | 0.003-0.13 |
| Mn | 0.5-3.5 |
| Si | 0.2-2.0 |
| Cr | <10 |
| Ni | 0.0-3.75 |
| Ti | 0.0-0.1 |
| Mo | 0.0-1.2 |
| B | 0.0-0.1 |
| V | 0.0-0.25 |
| Sb | 0.04-0.3 |
| Fe | 85.6-99.25 | and wherein forming a mild steel weld said wire contains based upon the total weight of the wire about:

| ELEMENT | Wt. % |
|---|---|
| C | 0.003-0.12 |
| Mn | 0.5-3.5 |
| Si | 0.2-2.0 |
| Cr | 0.0-0.5 |
| Ni | 0.0-0.5 |
| Ti | 0.0-0.1 |
| Mo | 0.0-0.5 |
| B | 0.0-0.1 |
| V | 0.0-0.5 |
| Sb | 0.04-0.3 |
| Fe | 96.25-99.25. |

2. The method of claim 1 wherein said wire contains nickel in an amount up to 0.5 wt. % based upon the total weight of the wire and the weld is a mild steel weld.

3. The method of claim 1 wherein said wire contains nickel in an amount up to 3.75 wt. % based upon the total weight of the wire and the weld is a low alloy steel weld.

4. The method of claim 1 wherein said wire is a low alloy steel weld wire and wire contains based upon the total weight of the wire about:

| ELEMENT | Wt. % |
|---|---|
| C | 0.003-0.13 |
| Mn | 0.5-3.5 |
| Si | 0.2-2.0 |
| Cr | <10 |
| Ni | 0.0-3.75 |
| Ti | 0.0-0.1 |
| Mo | 0.0-1.2 |
| B | 0.0-0.1 |
| V | 0.0-0.25 |
| Sb | 0.04-0.3 |
| Fe | 85.6-99.0. |

5. The method of claim 1 wherein the core contains based upon the total weight of the core about:

| ELEMENT | Wt. % |
|---|---|
| C | 0.003-0.13 |
| Mn | 0.5-3.5 |
| Si | 0.2-2.0 |
| Cr | <10 |
| Ni | 0.0-3.75 |
| Ti | 0.0-0.1 |
| Mo | 0.0-1.2 |
| B | 0.0-0.1 |
| V | 0.0-0.25 |
| Sb | 0.04-0.3 |
| Fe | 0.0-44.0. |

6. The method of claim 1 wherein the core contains based upon the total weight of the core about:

| ELEMENT | Wt. % |
|---|---|
| C | 0.003-0.12 |
| Mn | 0.5-3.5 |
| Si | 0.2-2.0 |
| Cr | 0.0-0.5 |
| Ni | 0.0-0.5 |
| Ti | 0.0-0.1 |
| Mo | 0.0-0.5 |
| B | 0.0-0.1 |
| V | 0.0-0.5 |
| Sb | 0.04-0.3 |
| Fe | 0.0-44.0. |

7. The method of claim 1 wherein the core contains based upon the total weight of the core about:

| ELEMENT | Wt. % |
|---|---|
| C | 0.003-0.13 |
| Mn | 0.5-3.5 |
| Si | 0.2-2.0 |
| Cr | <10 |
| Ni | 0.0-3.75 |
| Ti | 0.0-0.1 |
| Mo | 0.0-1.2 |
| B | 0.0-0.1 |
| V | 0.0-0.25 |
| Sb | 0.04-0.3 |
| Fe | 0.0-44.0. |

8. The method of claim 1 wherein the wire contains at least about 0.5 wt. % manganese and at least about 0.2 wt. % silicon based upon the total weight of the wire.

9. The method of claim 1 wherein the wire contains about 0.03 to 0.05 wt. % titanium and about 0.002 to 0.004 wt. % boron based upon the total weight of the wire.

10. The method of claim 1 wherein the wire contains a slag-modifying additive, and in terms of the amounts of carbon, manganese, silicon, phosphorus, sulfur and iron, the wire based upon the total weight of the wire has one of the compositions shown in the following table:

| C | Mn | Si | P | S | Fe |
|---|---|---|---|---|---|
| .06 | 1.39 | .70 | .011 | .014 | Balance |
| .09 | 1.47 | .70 | .008 | .013 | Balance |
| .04 | 1.50 | .70 | .008 | .013 | Balance |
| .09 | 1.29 | .61 | .010 | .016 | Balance |
| .05 | 1.56 | .75 | .009 | .013 | Balance |
| .06 | 1.62 | .63 | .011 | .016 | Balance |
| .09 | 1.67 | .67 | .012 | .018 | Balance |
| .03 | .50 | .30 | .015 | .015 | Balance. |

11. The method of claim 1 wherein the wire contains a slag-modifying additive, and in terms of the amounts of carbon, manganese, silicon, nickel, chromium, molybdenum, copper and iron, the wire based upon the total weight of the wire has one of the compositions shown in the following table:

| C | Mn | Si | Ni | Cr | Mo | Cu | Fe |
|---|---|---|---|---|---|---|---|
| .07 | .78 | .42 | — | 1.25 | .47 | — | Balance |
| .06 | .82 | .29 | — | 1.36 | .50 | — | Balance |
| .10 | 1.27 | .30 | .01 | — | .49 | .05 | Balance |
| .08 | 1.94 | .66 | .02 | — | .50 | .02 | Balance |
| .05 | 1.11 | .36 | .88 | — | .13 | — | Balance |
| .05 | .86 | .21 | .97 | — | .14 | — | Balance |
| .06 | 1.16 | .37 | 2.42 | — | — | — | Balance |
| .03 | .77 | .28 | 2.23 | — | — | — | Balance |
| .04 | 1.19 | .63 | .61 | .55 | — | .54 | Balance |
| .05 | 1.32 | .33 | 1.89 | — | .37 | — | Balance |
| .03 | 1.30 | .28 | 1.72 | — | .41 | — | Balance |
| .09 | .62 | .39 | — | 2.07 | 1.01 | — | Balance |
| .07 | .70 | .35 | — | 2.30 | 1.00 | — | Balance |
| .07 | 1.63 | .48 | 2.22 | .21 | .59 | — | Balance |

12. The method of claim 1 wherein the wire contains about 0.06 wt. % C, 1.39 wt. % Mn, 0.70 wt. % Si, 0.011 wt. % P, 0.014 wt. % S, 0.04-0.3 wt. % Sb, and the balance iron.

13. The method of claim 1 wherein the wire contains about 0.09 wt. % C, 1.47 wt. % Mn, 0.70 wt. % Si, 0.008 wt. % P, 0.013 wt. % S, 0.04-0.3 wt. % Sb, and the balance iron.

14. The method of claim 1 wherein the wire contains about 0.04 wt. % C, 1.50 wt. % Mn, 0.70 wt. % Si, 0.008 wt. % P, 0.013 wt. % S, 0.04-0.3 wt. % Sb, and the balance iron.

15. The method of claim 1 wherein the wire contains about 0.09 wt. % C, 1.29 wt. % Mn, 0.61 wt. % Si, 0.010 wt. % P, 0.016 wt. % S, 0.04-0.3 wt. % Sb, and the balance iron.

16. The method of claim 1 wherein the wire contains about 0.05 wt. % C, 1.56 wt. % Mn, 0.75 wt. % Si, 0.009 wt. % P, 0.013 wt. % S, 0.04-0.3 wt. % Sb, and the balance iron.

17. The method of claim 1 wherein the wire contains about 0.06 wt. % C, 1.62 wt. % Mn, 0.63% Si, 0.011% P, 0.016% S, 0.04-0.3% Sb, and the balance iron.

18. The method of claim 1 wherein the wire contains about 0.09% C, 1.67% Mn, 0.67% Si, 0.012% P, 0.018% S, 0.04-0.3 wt. % Sb, and the balance iron.

19. The method of claim 1 wherein the wire contains about 0.03 wt. % C, 0.50 wt. % Mn, 0.30 wt. % Si, 0.015 wt. % P, 0.015 wt. % S, 0.04-0.3 wt. % Sb, and the balance iron.

20. The method of claim 1 wherein the wire contains about 0.07 wt. % C, 0.78 wt. % Mn, 0.42 wt. % Si, 1.25 wt. % Cr, 0.47 wt. % Mo, 0.04-0.3 wt. % Sb, and the balance iron.

21. The method of claim 1 wherein the wire contains about 0.06 wt. % C, 0.82 wt. % Mn, 0.29 wt. % Si, 1.36 wt. % Cr, 0.50 wt. % Mo, 0.04-0.3 wt. % Sb, and the balance iron.

22. The method of claim 1 wherein the wire contains about 0.10 wt. % C, 1.27 wt. % Mn, 0.30 wt. % Si, 0.01 wt. % Ni, 0.49 wt. % Mo, 0.05 wt. % Cu, 0.04 to 0.3 wt. % Sb, and the balance iron.

23. The method of claim 1 wherein the wire contains about 0.08 wt. % C, 1.94 wt. % Mn, 0.66 wt. % Si, 0.02 wt. % Ni, 0.50 wt. % Mo, 0.02 wt. % Cu, 0.04 to 0.3 wt. % Sb and the balance iron.

24. The method of claim 1 wherein the wire contains about 0.05 wt. % C, 1.11 wt. % Mn, 0.36 wt. % Si, 0.88 wt. % Ni, 0.13 wt. % Mo, 0.04 to 0.3 wt. % Sb, and the balance iron.

25. The method of claim 1 wherein the wire contains about 0.05 wt. % C, 0.86 wt. % Mn, 0.21 wt. % Si, 0.97 wt. % Ni, 0.14 wt. % Mo, 0.04 to 0.3 wt. % Sb, and the balance iron.

26. The method of claim 1 wherein the wire contains about 0.06 wt. % C, 1.16 wt. % Mn, 0.37 wt. % Si, 2.42 wt. % Ni, 0.04 to 0.3 wt. % Sb, and the balance iron.

27. The method of claim 1 wherein the wire contains about 0.03 wt. % C, 0.77 wt. % Mn, 0.28 wt. % Si, 2.23 wt. % Ni, 0.04 to 0.3 wt. % Sb, and the balance iron.

28. The method of claim 1 wherein the wire contains about 0.04 wt. % C, 1.19 wt. % Mn, 0.63 wt. % Si, 0.61 wt. % Ni, 0.55 wt. % Cr, 0.54 wt. % Cu, 0.04 to 0.3 wt. % Sb and the balance iron.

29. The method of claim 1 wherein the wire contains about 0.05 wt. % C, 1.32 wt. % Mn, 0.33 wt. % Si, 1.89 wt. % Ni, 0.37 wt. % Mo, 0.04 to 0.3 wt. % Sb, and the balance iron.

30. The method of claim 1 wherein the wire contains about 0.03 wt. % C, 1.30 wt. % Mn, 0.28 Si, 1.72 wt. % Ni, 0.41 wt. % Mo, 0.04 to 0.3 wt. % Sb, and the balance iron.

31. The method of claim 1 wherein the wire contains about 0.09 wt. % C, 0.62 wt. % Mn, 0.39 wt. % Si, 2.07 wt. % Cr, 1.01 wt. % Mo, 0.04 to 0.3 wt. % Sb, and the balance iron.

32. The method of claim 1 wherein the wire contains about 0.07 wt. % C, 0.70 wt. % Mn, 0.35 wt. % Si, 2.30 wt. % Cr, 1.00 wt. % Mo, 0.04 to 0.3 wt. % Sb, and the balance iron.

33. The method of claim 1 wherein the wire contains about 0.07 wt. % C, 1.63 wt. % Mn, 0.48 wt. % Si, 2.22 wt. % Ni, 0.21 wt. % Cr, 0.59 wt. % Mo, 0.04 to 0.3 wt. % Sb, and the balance iron.

34. The method of claim 1 wherein the weld is characterized in that it has slag islands located only in areas removed from the toes.

* * * * *